March 27, 1956     B. POLL     2,739,548

PLANT-CARRYING ARM FOR A TRANSPLANTER

Filed April 22, 1954     2 Sheets-Sheet 1

INVENTOR.
Benjamin Poll
BY
Glenn B. Moore
Attorney

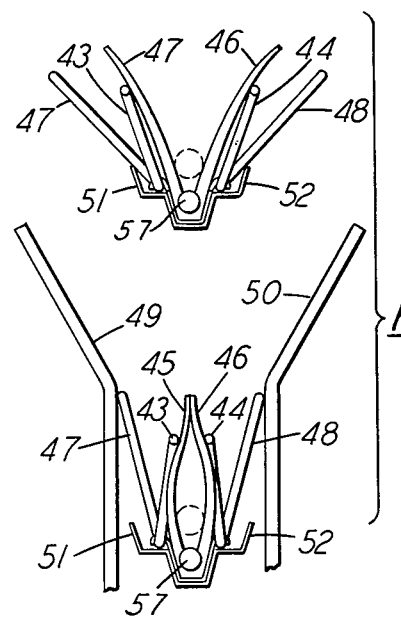
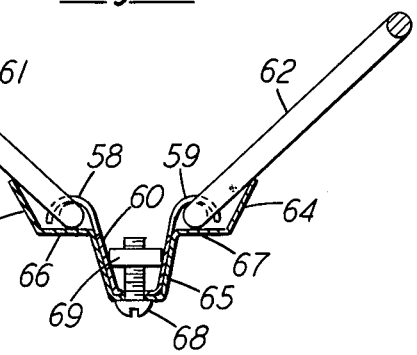
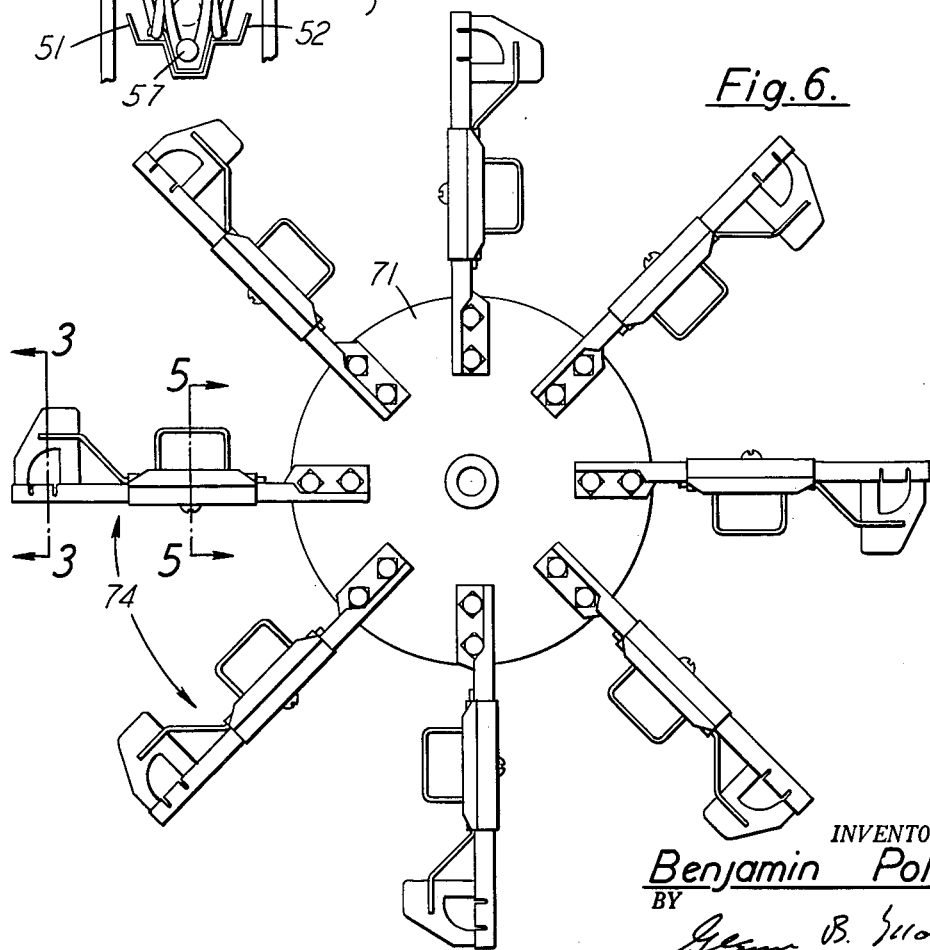

United States Patent Office 2,739,548
Patented Mar. 27, 1956

2,739,548

PLANT-CARRYING ARM FOR A TRANSPLANTER

Benjamin Poll, Holland, Mich.

Application April 22, 1954, Serial No. 424,941

10 Claims. (Cl. 111—3)

This invention relates to the construction of transplanters, and particularly to that portion of these machines which grasps the plants at a loading station and carries them to a planting position where they are released from the control of the machine. In addition to this structure, transplanters conventionally include suitable ground-working equipment which operates to open a furrow in the ground ahead of the position where the plants are placed. The ground-working equipment also includes a furrow-closing device which closes the furrow around the plant to provide the necessary growing conditions and support after it is released by the machine. Usually, the grasping-conveying system and the ground-working units are mounted on a frame provided with wheels so that the machine may be conveniently drawn by a tractor or some other vehicle. Devices of this general type are illustrated in my previous Patents 1,996,686 and 2,216,923.

The successful operation of a transplanter is dependent upon its ability to grasp securely and without injury a considerable variety of plants without requiring a high degree of attention on the part of the operator to positioning the plants in the machine. The individual variation between plants of various types and ages is a complicating factor which must be allowed for without generating a prohibitively-expensive mechanism. Applicant's extensive experience with these machines indicates that there are several features which should be embodied in a plant-grasping mechanism in order to assure the most satisfactory performance. Several of these features are listed as follows:

(a) It is preferable that the plant-receiving member have a generally trough-shaped receiving area that opens and closes from both directions with respect to a vertical plane.

(b) Except for the basic supporting beam on which the clamping portions are mounted, it is preferable that structure other than that performing the actual clamping function be eliminated to avoid interference with the plant.

(c) Experience also indicates that the primary gripping operation is best performed by soft pliable members appropriately urged into clamping position, and that it is desirable to combine this clamping action with a secondary clamping function at another position along the length of the plant, this secondary clamping being essentially for the purpose of centering the plant rather than providing a positive gripping action. The primary clamping function should be performed at the stem area of the plant, and the guiding function may be used to position the upper portion of the plant without crushing it.

(d) For purposes of economy and compactness, it is preferable that some portion of the guiding or gripping portion be used to engage a suitable cam surface for actuating the clamping mechanism. Use of the secondary clamping portion for this purpose provides for the uniform conducting of the plant into the area adjacent the cam without excessive danger of damage. It is also desirable that cam surfaces on opposite sides of the path of the clamping member provide a sheltered path for the plants as they move toward planting position. The cam plates thereby perform a dual function, and the actuation of the clamping arm by the plates serves to conduct the plants smoothly and without danger into the protected area.

(e) The replacement of the pliable grasping members should be possible without extensive disassembly of the machine, and should require little or no special skill.

(f) In the case where the plant-grasping members are mounted on a chain-type conveyor, it is preferable that a member be incorporated in the structure which will stabilize the position of one arm with respect to the other on the chain, and can also be used to provide an abutment limiting the position of the plant as it is placed in the machine by the operator.

The several features summarized briefly above, and others related thereto, are provided by this invention, which has proved to be a very valuable improvement over the other devices known to the art. The structure provided by the present invention includes a cantilever beam mounted on the conveyor section of the machine. This conveyor may be formed either by an endless chain positioned by suitable sprockets, or may be in the form of a wheel from which the plant-grasping arms project radially. Preferably, this beam is channel-shaped in cross-section, the material forming the walls of the channel being formed to provide opposite sets of bearings generally parallel to the beam axis. The outer end of this beam is formed to receive the two opposite flaps of pliable material forming a plant-grasping member, these flaps preferably being the result of a continuous piece folded at approximately the center. In the sense used herein, "folded" includes a member which may be originally molded in a V-shaped configuration. The pliable flaps extend generally perpendicularly from the beam, and are held within the U-shaped cross-section at the fold by a pin which engages a sleeve established by opposite inwardly-turned portions of the walls of the channel of the beam. The pliable flaps are urged into clamping position by opposite clamping members preferably bent from round rod material with journal portions disposed to engage the bearings formed on the beam. The clamping members have sections thereof displaced from the axis of the bearings and disposed to engage the side of the pliable flaps and urge them together. These clamping members also have other sections displaced from the axis of the bearings. These latter portions may be considered as secondary clamping or "centering" portions, and are preferably formed so that they remain open when the flap portions have been closed. Suitable stops are also preferably provided to limit the opening movement of the clamping member. The actuation of the clamping members is provided by the engagement of the centering portions with opposite cam plates disposed to follow the path of movement of the plant-grasping arm assemblies. These plates, in urging the two opposite centering portions together, result in the closure of the pliable flaps to securely retain the plant in position.

The several features of this invention will be analysed in detail through a discussion of the particular embodiments illustrated in the accompanying drawings. In the drawings.

Figure 3:
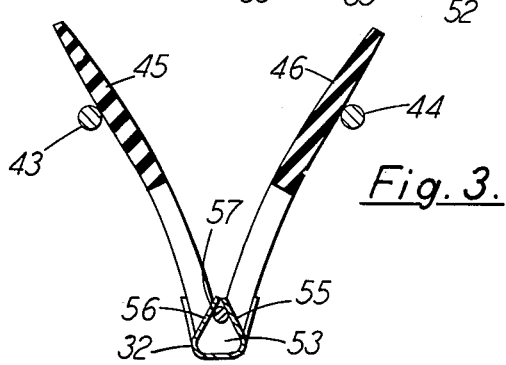

Figure 3 presents an enlarged section taken on the plane 3—3 of Figure 6.

Figure 1:
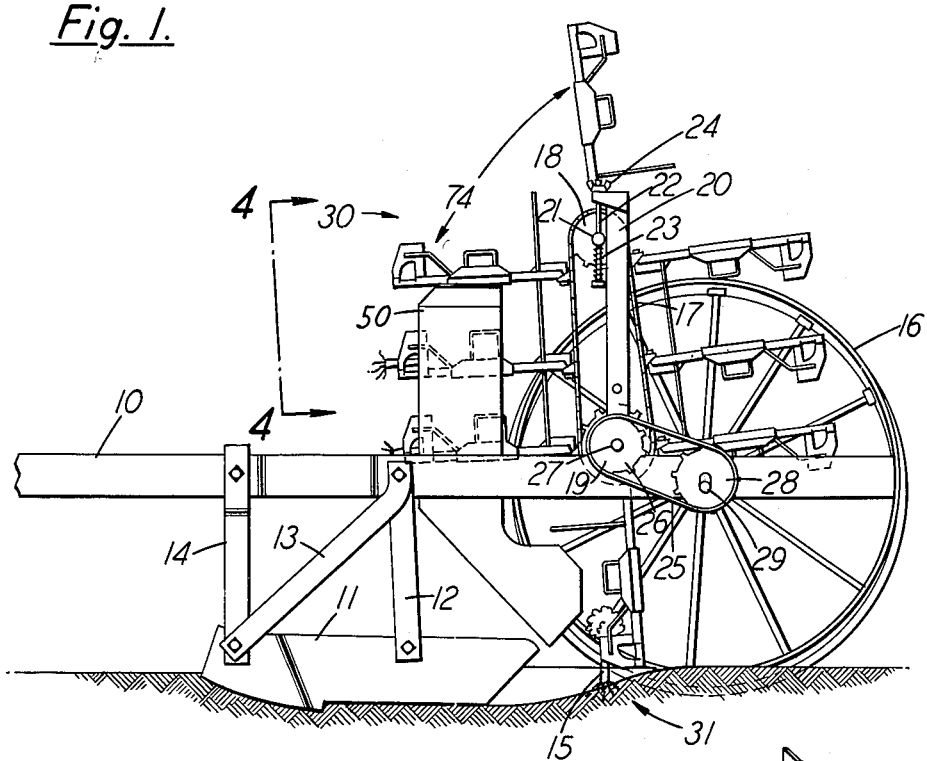
Figure 1 is a side elevation of a transplanter embodying one form of this invention.

Figure 4 presents a view taken on an enlarged scale on the plane 4—4 of Figure 1. The showing of Figure 4 is restricted to the plant-grasping structure, the remainder of the machine being deleted for clarity.

Figure 5 presents an enlarged sectional view taken on the plane 5—5 of Figure 6.

Figure 6 illustrates a modified form of the conveyor system from that shown in Figure 1, with substantially the same plane-grasping arm assembly being provided.

Referring to Figure 1, the illustrated transplanter includes the frame 10. A plow unit 11 is secured with respect to the frame 10 by braces as noted at 12, 13, and 14. The plow 11 opens a planting furrow in which plants 15 are deposited by the machine, the furrow then being closed by opposite wheels 16 disposed on opposite sides of the furrow.

In the device shown in Figure 1, a conveying unit is formed by the endless chain 17 positioned by the spockets 18 and 19 supported by the vertical column structure 20. The upper shaft 21 of the conveyor is resiliently positioned through the action of a bolt 22 and a spring 23 interposed between the head of the bolt and the shaft to maintain a desired amount of tension on the chain 17 through adjustment of the wing nut 24. Driving power for the conveyor system is supplied through the chain 25 which engages the sprocket 26 mounted on the shaft 27 of the conveyor chain sprocket 19. The chain 25, in turn, is driven by the sprocket 28 mounted on the shaft 29, both the sprocket 28 and the furrow wheel 16 being fixed with respect to each other.

Figure 2:
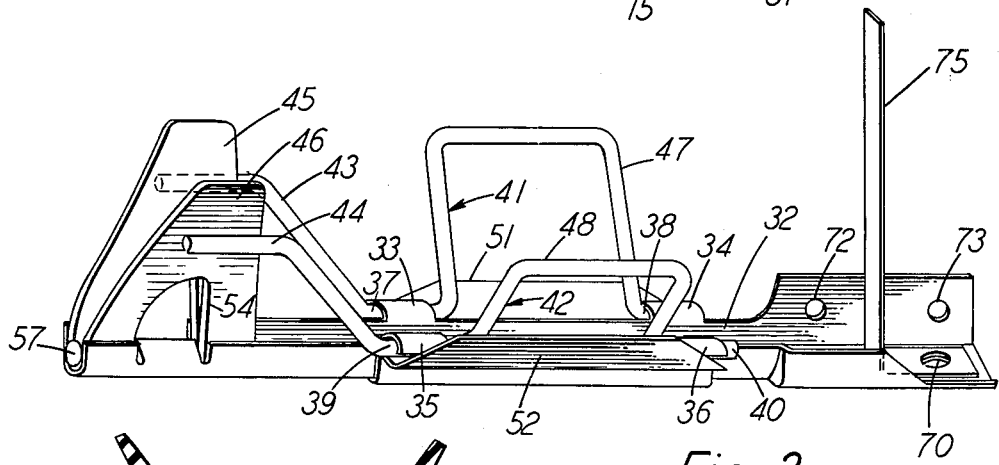
Figure 2 is a view on an enlarged scale showing the plant-grasping arm assembly of the type used in the machine illustrated in Figure 1.

The arrangement for holding the plants firmly in position so that they can be transferred by the conveyor system from the "loading" position generally indicated at 30 in Figure 1 over to the "planting" position noted at 31 is illustrated in detail in Figure 2. A series of plant-grasping arm assemblies is mounted in uniformly spaced relationship along the chain 17, each of these assemblies being preferably constructed as shown in Figure 2. A beam 32 is preferably channel-shaped in cross-section, and is mounted at its inner end on the chain 17. The beam extends generally perpendicularly to the chain, portions of the material forming the side walls of the U-shaped cross-section being formed to provide the bearings 33, 34, 35, and 36. The set of bearings 33 and 34 are coaxial, as are the set 35 and 36, and cooperate respectively with the journals 37, 38, 39, and 40 of the clamping members 41 and 42 as shown. These clamping members are preferbaly bent from rod material, and include the portions 43 and 44, respectively, disposed to bear against the pliable flaps 45 and 46 to induce clamping action therebetween. The centering portions 47 and 48 are axially displaced along the beam 32 from the portions 43 and 44, and generate a secondary clamping action which is primarily for the purpose of centering the upper end of the plants for movement through the machine. As indicated at Figure 4, the portions 43 and 44 come together before the portions 47 and 48, the closing movement being induced by the cam plates 49 and 50, respectively. The upper portion of Figure 4 indicates the open, or plant-receiving, position of the arm assembly in the neighborhood of the loading station 30. In this position, the open attitude of the clamping member is determined by the stops 51 and 52, which are formed by sections of sheet metal secured to the beam 32. As the plant-grasping arm assemblies move downwardly as shown in Figure 4, the engagement of the portions 47 and 48 with the cam plates 49 and 50, respectively, induces corresponding closing movement of the portions 43 and 44 and brings the flaps 45 and 46 together to securely grasp a plant whose position is indicated in dotted lines.

The construction and mounting of the pliable grasping member is best shown by a comparison of Figures 2 and 3. It is preferable that the flaps 45 and 46 be extensions of a continuous member having a "fold" at 53. In the preferred form of the invention, an opening 54 is provided in the continuous piece of material, with the opening extending across the fold so as to provide for the presence of the inwardly-turned portions 55 and 56 of the material forming the side wall of the beam 32. The portions 55 and 56 form a sleeve for receiving the pin 57 which securely retains the pliable clamping member in position.

Figure 5 illustrates the preferred construction at the point where the centering portion of the clamping members is rotatably mounted on the beam. The arcuate portions 58 and 59 have been formed from the material of the side walls of the channel-shaped beam 60 (similar to beam 32 in the previous figures) and the securing of the clamping members 61 and 62 into the bearings is provided by the plate which forms the stops 63 and 64. This plate is provided with a portion 65 formed to receive the channel 60, and with the laterally extending portions 66 and 67 disposed opposite the arcuate portions 58 and 59. A screw 68 engages a nut 69 confined between the side walls of the channel 60, and retains the stop plate in its assembled position.

The plant-grasping arm assemblies as shown in Figure 2 may be bolted to the chain 17 at the aperture 70, or may be secured to the wheel 71 by bolts passing through apertures 72 and 73. When the similar arm assemblies which are indicated at 74 in Figures 1 and 6 are mounted on a chain unit of the type shown in Figure 1, it is preferable that the abutment member 75 be secured in position as shown in Figure 2 to stabilize the position of one arm assembly with repsect to the other, and also to provide a limit stop to the insertion of the plants. The essental difference between the conveyor system shown in Figure 1 and the structure shown in Figure 6 is the replacement of the chain 17 by the wheel unit 71. Both of these conveyors serve essentially the same purpose, that of transferring the plants within the control of the grasping-arm assemblies from the loading position 30 to the planting position 31.

The particular embodiments of the present invention which have been illustrated and discussed herein are for illustrative purposes only, and are not to be considered as a limitation upon the scope of the appended claims. In these claims, it is my intent to claim the entire invention disclosed herein, except as I am limited by the prior art.

I claim:

1. In a transplanting machine including a frame, a loading station, a planting station, conveying means, and drive means for said conveying means: plant-grasping arm means comprising, beam means attached to said conveying means and projecting therefrom, said beam means having portions thereof formed in a channel-shaped cross-section and having opposite sets of bearing means formed of the material of the sides of said channel-shaped cross-section disposed with the axes thereof parallel to said beam means; plant-gripping means, including a pair of opposite flap portions of pliable material extending substantially perpendicularly from said beam means at the unsupported end thereof; opposite clamping means having journal portions engaging said opposite bearing means respectively, and having centering portions and flap-actuating portions each disposed radially from the axis of said bearing means; stop means mounted on said beam means for limiting the opening movement of said clamping means; and opposite positioning cam means fixed with respect to said frame and adapted to bear against a portion of said clamping means at selected positions along the path of movement of said clamping means whereby plants are gripped by said plant-gripping means as said arm means moves past said loading station and are released at said planting station, said conveyor means and plant-grasping arm means being disposed to bring plants held by said arm means from said loading station to planting position at said planting station.

2. In a transplanting machine including a frame, a loading station, a planting station, conveying means, and drive means for said conveying means: plant-grasping arm means comprising, beam means attached to said conveying means and projecting therefrom, said beam means having portions thereof formed in a channel-shaped cross-section and having opposite sets of bearing means disposed with the axes thereof parallel to said beam means; plant-gripping means, including a pair of opposite flap portions of pliable material extending substantially perpendicularly from said beam means at the unsupported end thereof, said flap portions being formed by a folded single piece having a central aperture forming a cut-away area at said fold; pin-retaining means formed of the material of the sides of said channel-shaped cross-section and providing a sleeve parallel to said beam means and adapted to be received in said aperture; pin means adapted to engage said sleeve and hold said piece at said fold within said channel-shaped cross-section; opposite clamping means having journal portions engaging said opposite bearing means respectively, and having flap-actuating portions each disposed radially from the axis of said bearing means; and opposite positioning cam means fixed with respect to said frame and adapted to bear against a portion of said clamping means at selected positions along the path of movement of said clamping means whereby plants are gripped by said plant-gripping means as said arm means moves past said loading station and are released at said planting station, said conveyor means and plant-grasping arm means being disposed to bring plants held by said arm means from said loading station to planting position at said planting station.

3. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; means for securing said beam to said conveying means; a pocket secured to the free end of said beam; said pocket being formed by two oppositely disposed flaps each made of a pliable material, said flaps diverging from each other and extending substantially radially from said beam thereby forming a V-shaped pocket substantially symmetrical about a plane passing through the axis of said beam and the circuitous path of said conveying means; and oppositely disposed clamping members rotatably mounted on said arm for relative movement with respect to said beam, said members having flap actuating portions engaging said flaps at points remote from the surface which clamps about said plants and cam-engaging portions adapted to engage opposite cam plates whereby when said cam portions are passed through spaced cam plates on said planting machine, said flap actuating portions are rotated toward each other causing said flaps to flex toward each other and close said pocket.

4. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; means for securing said beam to said conveying means; a pocket secured to the free end of said beam; said pocket being formed by two oppositely disposed flaps each made of a pliable but essentially self-supporting material, said flaps diverging from each other and extending substantially radially from said beam thereby forming a V-shaped pocket substantially symmetrical about a plane passing through the axis of said beam and the circuitous path of said conveying means; and oppositely disposed clamping members rotatably mounted on said arm for relative movement with respect to said beam, said members having flap actuating portions engaging said flaps at points remote from the surface which clamps about said plants and cam-engaging portions adapted to engage opposite cam plates whereby when said cam portions are passed through spaced cam plates on said planting machine, said flap actuating portions are rotated toward each other causing said flaps to flex toward each other and close said pocket.

5. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; means for securing said beam to said conveying means; a single piece of pliable but essentially self-supporting material folded at substantially its axis of symmetry normally forming two flaps defining an open V-shaped, plant receiving pocket substantially symmetrical about a plane passing through said beam and the circuitous path of said conveying means; said single piece pocket being secured to the free end of said beam at the fold thereof; and oppositely disposed clamping members rotatably mounted on said arm for relative movement with respect to said beam; said members having flap actuating portions engaging said flaps at points remote from the surface which clamps about said plants and cam engaging portions adapted to engage opposite cam plates whereby when said cam portions are passed through spaced cam plates on said planting machine said flap actuating portions are rotated toward each other causing said flaps to flex toward each other and close said pocket.

6. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; means for securing said beam to said conveying means; a pair of flexible flaps extending substantially radially from the free end of said beam forming a V-shaped pocket symmetrical about a plane passing through said beam and the circuitous path of said conveying means; and oppositely disposed clamping members rotatably mounted on said arm for relative movement with respect to said beam, said members having flap actuating portions engaging said flaps and cam-engaging portions adapted to engage opposite cam plates whereby when said cam portions are passed through spaced cam plates on said planting machine said flap actuating portions are rotated toward each other causing said flaps to flex toward each other and close said pocket; said cam engaging portions being located between said pocket and the end of said beam secured to said conveying means; said cam engaging portions forming a normally open V-shaped foliage receiving, guiding, and protecting means; said means adapted to grasp and protect the plant's foliage simultaneously with the closing of said flaps.

7. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; means for securing said beam to said conveying means; a pocket secured to the free end of said beam; said pocket being formed by two oppositely disposed flaps each made of a pliable but essentially self-supporting material, said flaps diverging from each other and extending substantially radially from said beam thereby forming a V-shaped pocket symmetrical about a plane passing through the axis of said beam and the circuitous path of said conveying means; and oppositely disposed clamping members rotatably mounted on said arm for relative movement with respect to said beam, said members each having flap-actuating portions engaging said flaps at points remote from the surface which clamps about said plants and cam engaging portions adapted to engage opposite cam plates whereby when said cam portions are passed through spaced cam plates on said planting machine said flap-actuating portions are rotated toward each other causing said flaps to flex toward each other and close said pocket; said cam engaging portions being located between said pocket and the end of said beam secured to said conveying means; said cam engaging portions being shaped to form a normally open V-shaped foliage receiving, guiding and protecting means; said means adapted to grasp and protect the plant's foliage simultaneously wiht the closing of said flaps.

8. In a planting machine, a conveying means having a circuitous movement, a plurality of plant-grasping arms mounted each at one end in spaced relation on the converying means, each of said plant-grasping arms comprising: a beam extending normal to the direction of movement of the conveying means; means for securing said beam to said conveying means; a pocket secured to the free end of said beam; said pocket being formed by two oppositely disposed flaps each made of a pliable but essentially self-supporting material, said flaps diverging from each other and extending substantially radially from said beam thereby forming a V-shaped pocket symmetrical about a plane passing through the axis of said beam and the circuitous path of said conveying means; and oppositely disposed clamping members rotatably mounted on said arm for relative movement with respect to said beam, said members each being formed of a rod rotatably mounted on said beam; said rod having a free end engaging one of said flaps at points remote from the surface which clamps about said plants and an intermediate portion bent to clamp about and protect the foliage of a plant inserted in said pocket; said intermediate portion of said rod also serving as a cam engaging portion adapted to engage opposite cam plates whereby when said cam portions are passed through spaced cam plates on said planting machine, said flap actuating portions are rotated toward each other causing said flaps to flex toward each other and close said pocket.

9. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; a pocket secured to the free end of said beam; said pocket being formed by two oppositely disposed flaps each made of a pliable but essentially self-supporting material, said flaps diverging from each other and extending substantially radially from said beam thereby forming a V-shaped pocket symmetrical about a plane passing through the axis of said beam; and oppositely disposed clamping members journaled in bearings located on each side of and intermediate the ends of said beam; said bearings being arranged parallel to the axis of said beam; each of said clamping members having a flap actuating portion and a cam portion disposed radially from the axis of said bearings; said cam engaging portion adapted to engage opposite cam plates whereby when said cam portions are passed through spaced cam plates on said planting machine, said flap actuating portions are rotated toward each other causing said flaps to flex toward each other and close said pocket.

10. In a planting machine, a conveying means having a circuitous movement, a plurality of plant-grasping arms mounted each at one end in spaced relation on the conveying means, each of said plant-grasping arms comprising: a beam extending normal to the direction of movement of the conveying means; means for securing said beam to said conveying means; a pocket secured to the free end of said beam; said pocket being formed by two oppositely disposed flaps each made of a pliable material, said flaps diverging from each other and extending substantially radially from said beam thereby forming a V-shaped pocket substantially symmetrical about a plane passing through the axis of said beam and the circuitous path of said conveying means; and oppositely disposed clamping members one on each side of said beam and mounted on said arm for relative movement toward each other with respect to said beam, said members having flap actuating portions and cam engaging portions adapted to engage opposite cam plates whereby when said cam portions are passed through spaced cam plates on said planting machine, said flap actuating portions are forced toward each other causing said flaps to flex toward each other and close said pocket.

References Cited in the file of this patent

UNITED STATES PATENTS

| | | |
|---|---|---|
| 653,298 | King | July 10, 1900 |
| 1,765,468 | Vollink | June 24, 1930 |
| 1,765,469 | Vollink | June 24, 1930 |
| 2,237,197 | Pomieraniec | Apr. 1, 1941 |